United States Patent
Blue et al.

(10) Patent No.: US 10,913,448 B2
(45) Date of Patent: Feb. 9, 2021

(54) METHODS AND SYSTEMS FOR OPERATING A VEHICLE DRIVELINE

(71) Applicant: Ford Global Technologies, LLC, Dearborn, MI (US)

(72) Inventors: Corey Blue, Ypsilanti, MI (US); Joseph Kucharski, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 186 days.

(21) Appl. No.: 16/165,749

(22) Filed: Oct. 19, 2018

(65) Prior Publication Data

US 2020/0122713 A1     Apr. 23, 2020

(51) Int. Cl.
*B60W 20/40*     (2016.01)
*B60W 10/02*     (2006.01)
*B60W 10/06*     (2006.01)

(52) U.S. Cl.
CPC ........... *B60W 20/40* (2013.01); *B60W 10/02* (2013.01); *B60W 10/06* (2013.01); *B60W 2520/00* (2013.01); *B60W 2540/12* (2013.01); *B60W 2540/18* (2013.01); *B60W 2710/027* (2013.01); *B60W 2710/0666* (2013.01)

(58) Field of Classification Search
CPC ...... B60W 10/02; B60W 10/06; B60W 20/40; B60W 2520/00; B60W 2540/12; B60W 2540/18; B60W 2710/027; B60W 2710/0666
See application file for complete search history.

(56) References Cited

U.S. PATENT DOCUMENTS

| | | | |
|---|---|---|---|
| 3,702,064 A * | 11/1972 | Ciolli | B60H 1/3225 62/158 |
| 6,059,682 A * | 5/2000 | Friedmann | F16D 13/72 192/113.35 |
| 7,103,468 B2 | 9/2006 | Wakashiro et al. | |
| 8,942,902 B2 | 1/2015 | Moseler | |
| 9,150,169 B2 | 10/2015 | Park et al. | |
| 9,278,688 B2 | 3/2016 | Kim et al. | |
| 2009/0062997 A1 * | 3/2009 | Iwase | F16H 61/20 701/68 |
| 2016/0032990 A1 * | 2/2016 | Nedorezov | B60W 10/08 477/5 |
| 2016/0096518 A1 * | 4/2016 | Li | F16H 61/12 701/112 |
| 2017/0350500 A1 * | 12/2017 | Inagaki | F16H 61/0206 |
| 2018/0099659 A1 * | 4/2018 | Jeong | B60W 10/08 |
| 2018/0204393 A1 | 7/2018 | Landolsi et al. | |
| 2018/0208214 A1 * | 7/2018 | Nakamura | B60W 20/40 |

FOREIGN PATENT DOCUMENTS

| | | |
|---|---|---|
| CN | 103953724 A | 7/2014 |
| CN | 104787038 A | 7/2015 |
| JP | H08232739 A | 9/1996 |

* cited by examiner

*Primary Examiner* — Tyler J Lee
(74) *Attorney, Agent, or Firm* — David Kelley; McCoy Russell LLP (57) ABSTRACT

Systems and methods for operating an engine and a driveline disconnect clutch are presented. In one example, a transient vehicle maneuver that may allow at least some air to be drawn into an oil pump pickup tube may be detected. Engine torque may be reduced and a pump output command may be increased responsive to the transient vehicle maneuver.

20 Claims, 4 Drawing Sheets

METHODS AND SYSTEMS FOR OPERATING A VEHICLE DRIVELINE

FIELD

The present description relates to a system and methods for improving drivability and durability of a vehicle. The methods may be particularly useful for engines that may be selectively coupled to an electrical machine and a transmission.

BACKGROUND AND SUMMARY

A hybrid vehicle may include a driveline disconnect clutch that allows an engine to be mechanically isolated from a remainder of a driveline so that the engine may be stopped (e.g., the engine's crankshaft is not rotating) while the driveline continues to rotate. The driveline disconnect clutch may be opened via a spring and closed via oil or fluid pressure in a hydraulic circuit. The hydraulic circuit may be supplied with oil via a transmission pump, and the transmission pump may include a pickup tube to draw oil in from an oil sump or reservoir. However, it may be possible for the pickup tube to draw air into the transmission pump rather than oil. If air is drawn into the pump, a closing force that may be applied to the driveline disconnect clutch may be reduced such that the driveline disconnect clutch may begin to slip. If the driveline disconnect clutch slips more than is desired, the driveline disconnect clutch may degrade. In addition, if a large amount of engine torque is requested when air is drawn into the transmission pump, vehicle performance may degrade since a torque capacity of the driveline disconnect clutch may be reduced.

The inventors herein have recognized the above-mentioned disadvantages and have developed a method of operating a vehicle driveline, comprising: adjusting operation of one or more components of the vehicle driveline via a controller responsive to a disconnect clutch with a fluid pressure having an average pressure that deviates from a commanded pressure by more than the threshold amount when air is drawn into a pump.

By adjusting one or more driveline components in response to a fluid pressure having an average pressure that deviates from a commanded pressure by more than a threshold amount when air is drawn into a pump, it may be possible to improve vehicle drivability and reduce the possibility of driveline disconnect clutch degradation. For example, if a vehicle braking is strong or if a vehicle aggressively negotiates a turn, a position of oil in a transmission reservoir may change such that air may be drawn into a pickup tube of a pump. Engine torque may be reduced and a commanded pump output may be increased so that the driveline disconnect clutch closing force may be maintained at a higher level and so that the engine generates a torque that may be transferred by the driveline disconnect clutch with a reduced amount of driveline disconnect clutch slip.

The present description may provide several advantages. Specifically, the approach may reduce driveline disconnect clutch slip. Further, the approach may improve vehicle drivability. Further still, the approach may reduce a possibility of driveline degradation, thereby increasing the operating life of the driveline.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to controlling a driveline of a hybrid vehicle.

Figure 1:
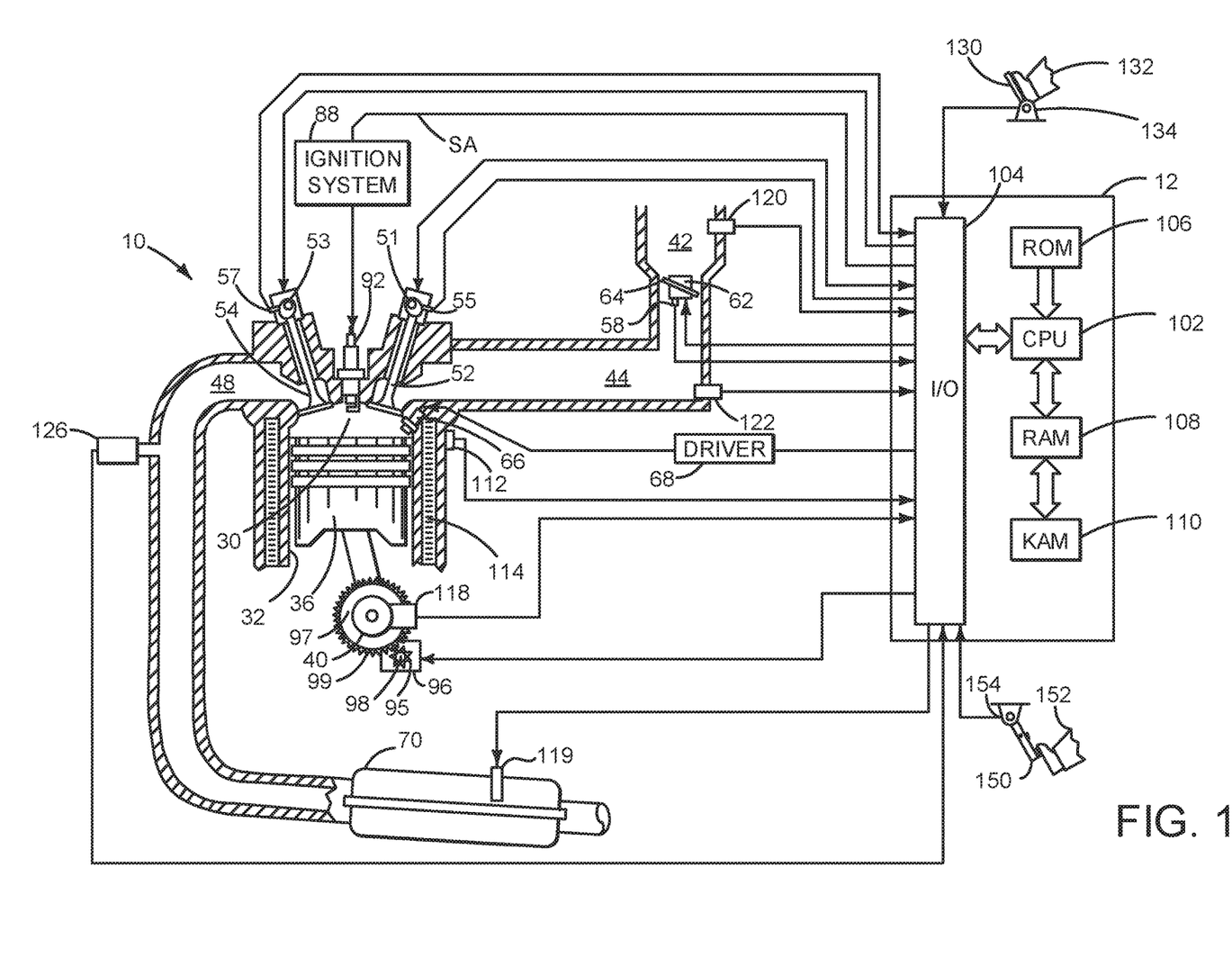
FIG. 1 is a schematic diagram of an engine.
Figure 2:
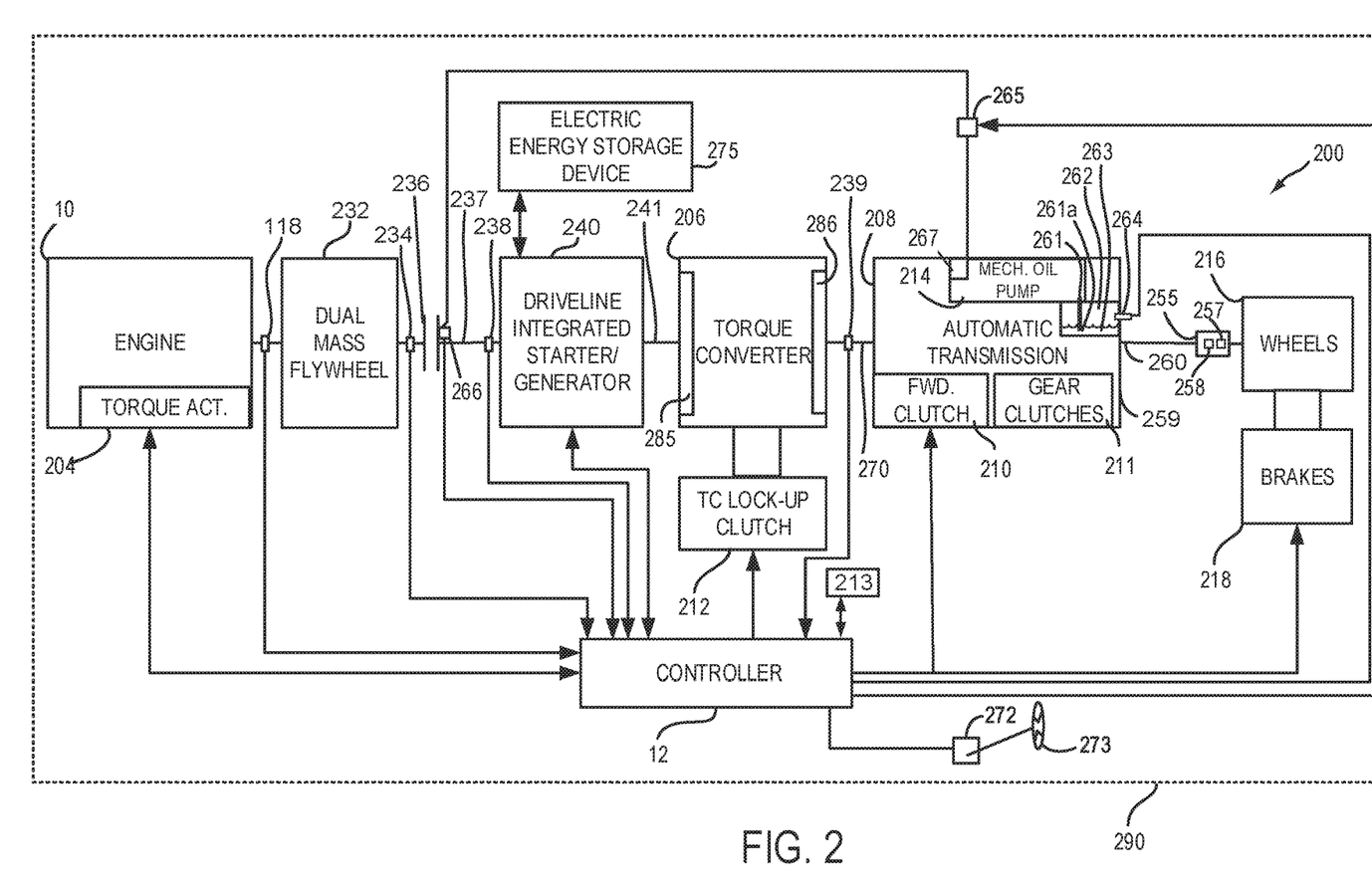
FIG. 2 is shows a first example vehicle driveline configuration.

The hybrid vehicle may include an engine and a driveline disconnect clutch as shown in FIGS. 1 and 2. The engine may be operated with or without a driveline integrated starter/generator (e.g., an electric machine or motor/generator that may be abbreviated DISG) during vehicle operation. The driveline integrated starter/generator is integrated into the driveline on the same axis as the engine crankshaft and it rotates whenever the torque converter impeller rotates. Further, the DISG may not be selectively engaged or disengaged with the driveline. Rather, the DISG is an integral part of the driveline. Further still, the DISG may be operated with or without operating the engine. The mass and inertia of the DISG remain with the driveline when the DISG is not operating to provide or absorb torque from the driveline. The driveline may be operated according to the sequence of FIG. 3 and the method of FIG. 4.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. In addition, controller 12 employs the actuators shown in FIGS. 1 and 2 to adjust driveline operation based on the received signals and instructions stored in memory of controller 12.

Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. Starter 96 may be described as a lower power starting device. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of a signal from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst, a particulate filter, a lean NOx trap, selective reduction catalyst, or other emissions control device. An emissions device heater 119 may also be positioned in the exhaust system to heat converter 70 and/or exhaust gases.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force and/or position applied by human 132; a position sensor 154 coupled to brake pedal 150 for sensing force and/or position applied by human 152; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200 in vehicle 290. Driveline 200 may be powered by engine 10. Engine 10 may be started with an engine starting system shown in FIG. 1 or via DISG 240. Further, engine 10 may generate or adjust torque via torque actuator 204, such as a fuel injector, throttle, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of driveline disconnect clutch 236. Driveline disconnect clutch 236 may be hydraulically actuated via oil supplied by pump 214 and pressure control valve 265. A position sensor 234 is positioned on the driveline disconnect clutch side of dual mass flywheel 232 to sense the output position and speed of the dual mass flywheel 232. In some examples, position sensor 234 may include a torque sensor. The downstream side of driveline disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a power output that is greater than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the driveline disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter impeller speed and position may be determined via sensor 238. Torque converter turbine speed and position may be determined via position sensor 239. In some examples, 238 and/or 239 may be torque sensors or may be combination position and torque sensors.

When torque converter clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter clutch 212 is fully engaged, the engine output torque is directly transferred via the torque converter clutch to an input shaft 270 of transmission 208. Alternatively, the torque converter clutch 212 may be partially engaged, thereby enabling the amount of torque directly relayed to the transmission 208 to be adjusted. The controller 12 may be configured to adjust the amount of torque transmitted by torque converter 206 by adjusting the torque converter clutch 212 in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Output shaft 260 delivers torque from transmission 208 to wheels 216 via differential 255 which includes first gear 257 and second gear 258. Automatic transmission 208 may transfer an input driving torque at the input shaft 270 responsive to a vehicle traveling condition before transmitting an output driving torque to the wheels 216.

Further, a frictional force may be applied to wheels 216 by engaging wheel friction brakes 218. In one example, wheel friction brakes 218 may be engaged in response to the driver pressing his/her foot on a brake pedal (not shown). In other examples, controller 12 or a controller linked to controller 12 may apply engage wheel friction brakes. In the same way, a frictional force may be reduced to wheels 216 by disengaging wheel friction brakes 218 in response to the driver releasing his/her foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter clutch 212. Oil pump 214 may be operated in accordance with torque converter 206, and it may be driven by the rotation of the engine 10 or DISG 240 via input shaft 241, for example. Alternatively, oil pump 214 may be electrically driven or it may be driven in a different manner. Thus, the hydraulic pressure generated in oil pump 214 may increase as an engine speed and/or DISG speed increases, and oil pressure may decrease as an engine speed and/or DISG speed decreases. Oil pump pressure may be adjusted via variable pump control mechanism 267 (e.g., squash plate, linkage, housing or component actuators, etc.) and/or pressure control valve 265 to increase or decrease torque capacity of driveline disconnect clutch 236. Oil pump 214 may include a pickup tube 261 that is includes an end 261a that may be submerged in oil 263 in reservoir or sump 262 when the vehicle is stationary. Sensor 264 may detect a level of oil 263 in reservoir or sump 262. During aggressive vehicle braking or while vehicle 290 aggressively negotiates a turn, end 261a may not be totally submerged such that it may draw some air into oil pump 214. Such conditions may occur if scheduled maintenance is not performed on vehicle 290. Further, such conditions may be determined or inferred when brake pedal 150 is applied and the vehicle is decelerating at more than a threshold rate or when steering sensor 272 indicates that steering wheel 273 is turned at an angle that is greater than a threshold angle while vehicle 290 is moving.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from DISG windings as is known in the art. Controller 12 may supply notifications to vehicle occupants and receive input data from vehicle occupants via human/machine interface 213. Human/machine interface may be a display panel with a touch screen, a keypad, or other known interface.

Thus, the system of FIGS. 1 and 2 provides for a vehicle driveline system, comprising: a transmission including a pump with an oil pickup tube; a driveline integrated starter/generator (DISG); an engine; a driveline disconnect clutch positioned in a driveline between the engine and the DISG; and one or more controllers including executable non-transitory instructions to operate the engine during a transient vehicle maneuver, operate the driveline disconnect clutch while an atypical driveline disconnect pressure is present, sense the transient vehicle maneuver, and adjust a driveline disconnect clutch command in response to the transient vehicle maneuver being sensed and the atypical driveline disconnect clutch pressure. The vehicle driveline system includes where the atypical driveline disconnect clutch pressure is a fluid pressure having an amplitude that increases by more than a first threshold amount and that decreases by more than a second threshold amount in a predetermined amount of time. The vehicle driveline system includes where the atypical driveline disconnect clutch pressure is a fluid pressure having an average pressure value that deviates from a commanded pressure by more than the threshold amount. The vehicle driveline system further comprises additional executable non-transitory instructions to reduce torque of the engine in response to the transient vehicle maneuver being sensed and the atypical driveline disconnect clutch pressure (e.g., pressure of fluid or oil being supplied to the driveline disconnect clutch). The vehicle driveline system further comprises additional executable non-transitory instructions to increase torque of the engine in response to ceasing the transient vehicle maneuver, where the transient vehicle maneuver is a maneuver that may affect hydraulic system pressures (e.g., pressure of oil supplied to the driveline disconnect clutch).

Figure 3:
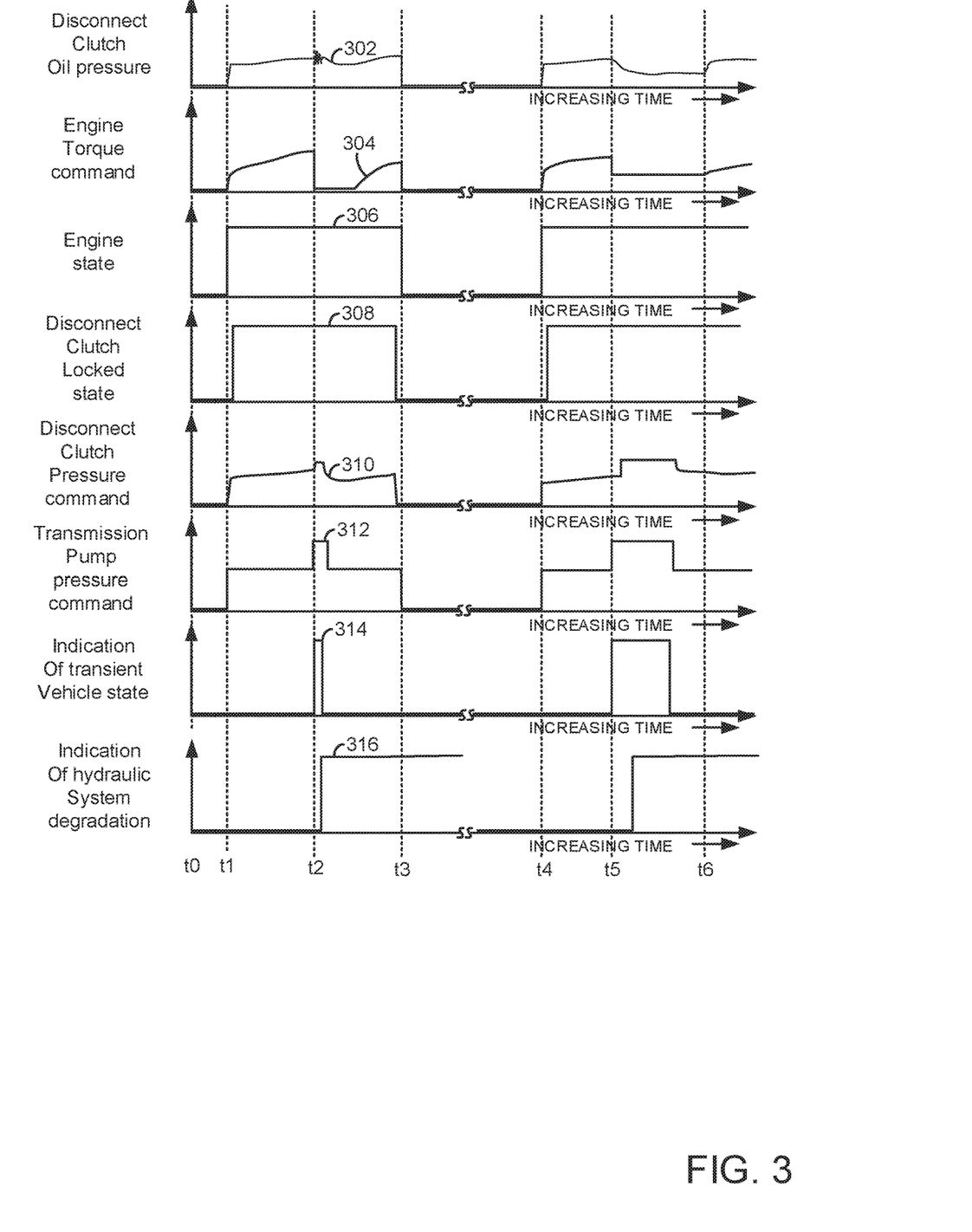
FIG. 3 shows an example vehicle operating sequence.

Referring now to FIG. 3, an example vehicle operating sequence is shown. The vehicle operating sequence of FIG. 3 may be provided via the method of FIG. 4 in cooperation with the system of FIGS. 1 and 2. The plots of FIG. 3 include double SS markers along horizontal axes that represent breaks in time. The break in time may be long or short. In addition, dotted vertical lines t0-t6 are shown at times of particular interest in the sequence.

The first plot from the top of FIG. 3 is a plot of driveline disconnect clutch oil pressure versus time. The vertical axis represents driveline disconnect clutch oil pressure and oil pressure increases in the direction of the vertical axis arrow. Trace 302 represents driveline disconnect clutch oil pressure. The horizontal axis represents time and time increases from the left side of FIG. 3 to the right side of FIG. 3.

The second plot from the top of FIG. 3 is a plot of an engine torque command (e.g., driver demand torque) or request versus time. The vertical axis represents the commanded engine torque and the amount of commanded engine torque increases in the direction of the vertical axis arrow. Trace 304 represents commanded engine torque. The horizontal axis represents time and time increases from the left side of FIG. 3 to the right side of FIG. 3.

The third plot from the top of FIG. 3 is a plot of engine operating state versus time. The vertical axis represents engine operating state and the engine is operating when trace 306 is at a level near the vertical axis arrow. The engine is not operating when trace 306 is near the horizontal axis. Trace 306 represents engine operating state. The horizontal axis represents time and time increases from the left side of FIG. 3 to the right side of FIG. 3.

The fourth plot from the top of FIG. 3 is a plot of driveline disconnect clutch lock state versus time. The vertical axis represents driveline disconnect clutch lock state and the driveline disconnect clutch is locked when trace 308 is at a level near the vertical axis arrow. The driveline disconnect clutch is not locked when trace 308 is near the horizontal axis. Trace 308 represents driveline disconnect clutch lock state. The horizontal axis represents time and time increases from the left side of FIG. 3 to the right side of FIG. 3.

The fifth plot from the top of FIG. 3 is a plot of a driveline disconnect clutch pressure command or request versus time. The vertical axis represents the commanded driveline disconnect clutch pressure and the driveline disconnect clutch pressure command increases in the direction of the vertical axis arrow. Trace 310 represents commanded driveline disconnect clutch pressure. The horizontal axis represents time and time increases from the left side of FIG. 3 to the right side of FIG. 3.

The sixth plot from the top of FIG. 3 is a plot of a transmission pump pressure command or request versus time. The vertical axis represents the commanded transmission pump pressure and the transmission pump pressure command increases in the direction of the vertical axis arrow. Trace 312 represents commanded transmission pump pressure. The horizontal axis represents time and time increases from the left side of FIG. 3 to the right side of FIG. 3.

The seventh plot from the top of FIG. 3 is a plot of indication of transient vehicle state that may affect hydraulic system pressures (e.g., hard vehicle braking or vehicle turning) versus time. The vertical axis represents indication of transient vehicle state and an indication of transient vehicle state is provided when trace 314 is at a level near the vertical axis arrow. The indication of transient vehicle state is not provided when trace 314 is near the horizontal axis. Trace 314 represents the indication of transient vehicle state. The horizontal axis represents time and time increases from the left side of FIG. 3 to the right side of FIG. 3.

The eighth plot from the top of FIG. 3 is a plot of an indication of hydraulic system degradation state versus time. The vertical axis represents the indication of hydraulic system degradation state and an indication of hydraulic system degradation is provided when trace 316 is at a level near the vertical axis arrow. The indication of hydraulic system degradation state is not provided when trace 316 is near the horizontal axis. Trace 316 represents the indication of hydraulic system degradation state. The horizontal axis represents time and time increases from the left side of FIG. 3 to the right side of FIG. 3.

At time t0, disconnect clutch pressure is low and the engine is not running (e.g., not combusting fuel). The disconnect clutch is unlocked and the disconnect clutch pressure command is low. The transmission pump pressure command is low and there is no indication of a transient vehicle state that may affect hydraulic system pressures. There is also no indication of hydraulic system degradation.

At time t1, the engine is started and disconnect clutch pressure is increased. The engine may be started in response to a human driver or a controller request (not shown). The disconnect clutch is locked shortly after time t1 and the disconnect clutch pressure command is increased at time t1. The transmission pump pressure command is increased and there is no indication of a transient vehicle state that may affect hydraulic system pressures. There is also no indication of hydraulic system degradation.

Between time t1 and time t2, the engine continues running and the engine torque command increases. The driveline disconnect clutch pressure increases so that engine torque may be transferred through the driveline disconnect clutch and the transmission pump output pressure command remains constant. The driveline disconnect clutch remains locked and there is no indication of a transient vehicle state that may affect hydraulic system pressures. Further, there is no indication of hydraulic system degradation.

At time t2, the engine continues running and the driveline disconnect clutch remains locked, but driveline disconnect clutch oil pressure begins to oscillate at a higher frequency (e.g., the driveline disconnect clutch pressure changes from an increasing value to a decreasing value and back to an increasing value with the amplitude of the driveline disconnect clutch oil pressure changing by more than a predetermined amount) than may be expected during nominal vehicle operating conditions. The driveline disconnect clutch oil pressure is affected via hard vehicle braking (not shown), which causes a small amount of air being ingested via a pickup tube of the transmission oil pump (not shown). An indication of transient conditions that may affect hydraulic system oil pressures is indicated. Shortly after the driveline disconnect oil pressure begins to oscillate at a higher frequency with an amplitude that is greater than a threshold between a pressure where the driveline disconnect pressure changes from an increasing pressure to a decreasing pressure and a pressure where the driveline disconnect clutch pressure changes from a decreasing pressure to an increasing pressure, an indication of hydraulic system degradation is indicated. The engine torque command is also decreased at time t2 and the driveline disconnect clutch pressure command and the transmission oil pump command are increased in response to the frequency of the driveline disconnect clutch pressure increasing so that the driveline disconnect clutch may remained locked even in the presence of a small amount of air being drawn into the transmission oil pump pickup tube.

Between time t2 and time t3, the indication of the transient vehicle state that may affect hydraulic system pressures is withdrawn and the driveline disconnect clutch pressure command is reduced in response to the engine torque command being lowered. The transmission pump command and the driveline disconnect clutch pressure command are also lowered in response to the indication of the transient vehicle state that may affect hydraulic system pressure being withdrawn.

At time t3, the engine is stopped and the driveline disconnect clutch pressure is reduced. The engine torque command is zero and the driveline disconnect clutch pressure is commanded to zero. The driveline disconnect clutch pressure command is reduced to zero shortly before time t3. The transmission pump command pressure is reduced to zero at time t3 and there is no indication of a transient vehicle state that may affect hydraulic system pressures. The indication of hydraulic system degradation remains asserted. A break in the timeline occurs between time t3 and time t4.

After the time break between time t3 and time t4, the driveline disconnect clutch pressure is low and the engine is not running (e.g., not combusting fuel). The disconnect clutch is unlocked and the disconnect clutch pressure command is low. The transmission pump pressure command is low and there is no indication of a transient vehicle state that may affect hydraulic system pressures. There is also no indication of hydraulic system degradation.

At time t4, the engine is started and disconnect clutch pressure is increased. The disconnect clutch is locked shortly after time t4 and the disconnect clutch pressure command is increased at time t4. The transmission pump pressure command is increased and there is no indication of a transient vehicle state that may affect hydraulic system pressures. There is also no indication of hydraulic system degradation.

Between time t4 and time t5, the engine continues running and the engine torque command increases. The driveline disconnect clutch pressure increases with the increasing engine torque and the transmission pump output pressure command remains constant. The driveline disconnect clutch remains locked and there is no indication of a transient vehicle state that may affect hydraulic system pressures. Further, there is no indication of hydraulic system degradation.

At time t5, the engine continues running and the driveline disconnect clutch remains locked, but average driveline disconnect clutch oil pressure begins to drop to a level that is lower than a level that may be expected during nominal vehicle operating conditions. The driveline disconnect clutch oil pressure is affected via hard vehicle turning event (not shown), which causes air to be ingested into the transmission oil pump via a pickup tube of the transmission oil pump (not shown). An indication of transient conditions that may affect hydraulic system oil pressures is indicated. Shortly after the driveline disconnect oil pressure begins to be reduced, an indication of hydraulic system degradation is indicated. The engine torque command is also decreased at time t5 and the driveline disconnect clutch pressure command and the transmission oil pump command are increased in response to the average value of the driveline disconnect clutch pressure decreasing to a level that is less than is expected so that the driveline disconnect clutch may remained locked even in the presence of a small amount of air being drawn into the transmission oil pump pickup tube. The indication of the transient vehicle state that may affect hydraulic system pressures is withdrawn between time t5 and time t6. Further, the driveline disconnect clutch pressure command is reduced in response to the engine torque command being lowered between time t5 and time t6. The transmission pump command and the driveline disconnect clutch pressure command are also lowered in response to the indication of the transient vehicle state that may affect hydraulic system pressure being withdrawn between time t5 and time t6.

At time t6, the engine torque command is increased and the driveline disconnect clutch pressure command is increased in response to the increased engine torque command. The transmission pump pressure command remains constant and there is no indication of a transient vehicle condition that may affect hydraulic system pressure. The driveline disconnect clutch remains locked and the indication of hydraulic system degradation remains asserted.

In this way, changes in driveline disconnect clutch pressure frequency and average pressure may be indicative of hydraulic system degradation. Further, the commanded transmission pump pressure and commanded driveline disconnect clutch pressure may be increased to maintain a driveline disconnect clutch in a locked state during conditions where hydraulic system hydraulic pressure may be affected.

Figure 4:
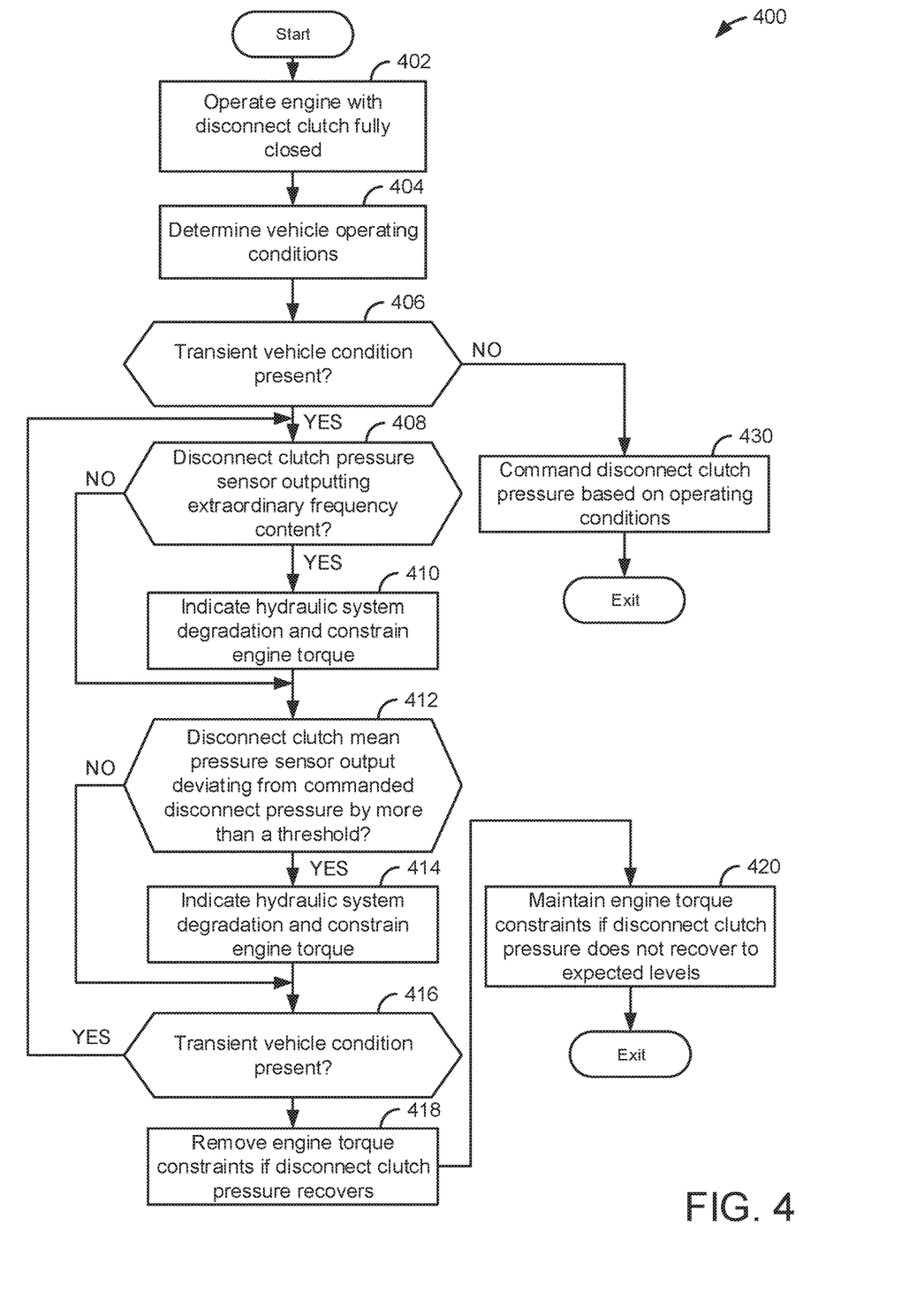
FIG. 4 is a flowchart showing one example of a vehicle operating method.

Referring now to FIG. 4, a flowchart of an example method to operate a vehicle driveline is shown. The method of FIG. 4 and subsequent methods may be stored as executable instructions in non-transitory memory of controller 12 shown in FIGS. 1-3. Further, the controller of FIGS. 1 and 2 may perform the actions described herein in the physical world to change a state of one or more devices. The controller may also perform computations and operate an engine while performing the method of FIG. 4.

At 402, method 400 operates an engine (e.g., the engine is combusting fuel) with a fully closed driveline disconnect clutch (e.g., there is less than a threshold amount of speed difference between an engine side of the driveline disconnect clutch and a transmission side of the driveline disconnect clutch. Fuel is injected to the engine responsive to driver demand torque and engine speed. The driveline disconnect clutch is closed via supplying fluid to the driveline disconnect clutch. Method 400 proceeds to 404.

At 404, method 400 determines vehicle operating conditions. Operating conditions may include but are not limited to engine speed, vehicle speed, brake pedal position, steering angle, engine temperature, disconnect clutch fluid pressure, and ambient temperature. Method 400 may determine the above mentioned conditions and other conditions via sensors and actuators previously described. Method 400 proceeds to 406.

At 406, method 400 judges if transient vehicle conditions that may affect hydraulic system pressure are present. Transient vehicle conditions that may affect hydraulic system pressure may include the presence of vehicle braking, steering angle, vehicle speed, and accelerator pedal position. If method 400 judges that the vehicle is braking (e.g., brake pedal applied greater than a threshold amount) and decelerating at a rate that is higher than a threshold rate, the answer is yes and method 400 proceeds to 408. Further, the answer may be yes if the vehicle steering angle is greater than a threshold angle and vehicle speed is greater than a threshold vehicle speed since hard cornering and vehicle speed may be transient conditions that affect hydraulic system pressures. If method 400 judges that transient vehicle conditions that may affect hydraulic system pressure are present, the answer is yes and method 400 proceeds to 408.

Otherwise, the answer is no and method 400 proceeds to 430. The step 406 may be optionally included.

At 430, method 400 commands the driveline disconnect clutch pressure to a pressure that is based on vehicle operating conditions. In particular, in one example, the driveline disconnect clutch pressure is commanded to the driver demand torque plus an offset torque capacity. For example, if driver demand torque is 100 Newton-meters and the offset torque capacity is 40 Newton-meters, the driveline disconnect clutch torque capacity is commanded to 140 Newton-meters. By commanding the driveline disconnect clutch torque capacity to a level that is higher than the driver demand torque, it may be possible to maintain the driveline disconnect clutch in a locked state. The driveline disconnect clutch torque capacity is an amount of torque that the driveline disconnect clutch may transfer from its input side to its output side without slipping. The driveline disconnect clutch command may increase the driveline disconnect clutch torque capacity by increasing a pressure of fluid supplied to close the driveline disconnect clutch. The driveline disconnect clutch command may decrease the driveline disconnect clutch torque capacity by decreasing a pressure of fluid supplied to close the driveline disconnect clutch. Method 400 proceeds to exit after commanding the fluid pressure that is applied to the driveline disconnect clutch.

At 408, method 400 judges if the driveline disconnect clutch fluid pressure sensor is outputting an extraordinary frequency produced via an extraordinary frequency of driveline disconnect clutch fluid or oil. The extraordinary frequency may be a frequency that is greater than a frequency that may be observed when air is not being drawn into the transmission pump pickup tube. Thus, if method 400 judges that the driveline disconnect clutch oil pressure begins to oscillate at a higher frequency (e.g., the driveline disconnect clutch pressure changes from an increasing value to a decreasing value and back to an increasing value in less than a threshold amount of time with the amplitude of the driveline disconnect clutch oil pressure changing by more than a predetermined amount) than may be expected during nominal vehicle operating conditions, then the answer is yes and method 400 proceeds to 410. Otherwise, the answer is no and method 400 proceeds to 412.

At 410, method 400 indicates hydraulic system degradation and constrains or limits engine torque output to less than a threshold amount of engine torque. The indication of hydraulic system degradation may be provided via a human/machine interface (e.g., a display panel or output of a light). Further, method 400 may change a state of a variable in memory to indicated hydraulic system degradation. Method 400 may also prevent engine torque from exceeding a threshold torque by limiting the amounts of air and fuel entering the engine. For example, the throttle may be restricted to opening less than a threshold amount and the fuel injectors may be restricted to open for less than a threshold duration during a cycle of the engine. By limiting engine torque output, slip of the driveline disconnect clutch may be avoided so as to reduce the possibility of driveline disconnect clutch degradation. Method 400 may also command increases in transmission pump output (e.g., flow or pressure) and driveline disconnect clutch pressure via pump actuators and valves so that the driveline disconnect clutch may remain in a locked state even if a small amount of air is drawn into the transmission fluid or oil pump. Method 400 proceeds to 412.

At 412, method 400 judges if the driveline disconnect clutch fluid or oil average pressure is more than a threshold amount less than a commanded driveline disconnect fluid or oil pressure. The actual average pressure of the driveline disconnect clutch fluid or oil may drop below the commanded driveline disconnect fluid or oil pressure if air is drawn into the transmission pump pickup tube. If method 400 observes that the driveline disconnect clutch fluid or oil average pressure is more than a threshold amount less than a commanded driveline disconnect fluid or oil pressure, then the answer is yes and method 400 proceeds to 414. Otherwise, the answer is no and method 400 proceeds to 416.

At 414, method 400 indicates hydraulic system degradation and constrains or limits engine torque output to less than a threshold amount of engine torque. The indication of hydraulic system degradation may be provided via a human/machine interface (e.g., a display panel or output of a light). Further, method 400 may change a state of a variable in memory to indicated hydraulic system degradation. Method 400 may also prevent engine torque from exceeding a threshold torque by limiting the amounts of air and fuel entering the engine. By limiting engine torque output, slip of the driveline disconnect clutch may be avoided so as to reduce the possibility of driveline disconnect clutch degradation. Method 400 may also command increases in transmission pump output (e.g., flow or pressure) and driveline disconnect clutch pressure via pump actuators and valves so that the driveline disconnect clutch may remain in a locked state even if a small amount of air is drawn into the transmission fluid or oil pump. Method 400 proceeds to 416.

At 416, method 400 judges if transient vehicle conditions that may affect hydraulic system pressure are present. If method 400 detects the vehicle transient conditions described at 406 being present, the answer is yes and method 400 proceeds to 418. Otherwise, the answer is no and method 400 returns to 408.

At 418, method 400 gradually removes the engine torque restraints if they were applied at 410 and 414 and if the driveline disconnect clutch fluid or oil pressure returns to an expected level. Thus, the engine torque may be commanded to follow driver demand torque and it is not limited responsive to pressure in the hydraulic system. Method 400 proceeds to 420.

At 420, method 400 continues to limit engine torque output if the driveline disconnect clutch fluid or oil pressure does not return to an expected level. Consequently, even if the transient vehicle condition that may affect pressure in the hydraulic system is complete, method 400 may prevent engine torque output from exceeding a threshold level, where the threshold level is based on hydraulic fluid pressure that is available to close the driveline disconnect clutch. For example, if the hydraulic fluid pressure may reach up to 200 Kilopascal (kPa), which provides 200 Newton-meters of driveline disconnect clutch torque capacity, then the engine torque output may be limited to less than 180 Newton-meters to reduce the possibility of driveline disconnect clutch slippage. Method 400 proceeds to exit.

In this way, an engine and driveline disconnect clutch may be controlled responsive to pressure of a fluid or oil supplied to close the driveline disconnect clutch. Further, limits on engine torque may be temporarily imposed and then removed after transient conditions that may result in hydraulic system degradation are present and then removed.

Thus, the method of FIG. 4 provides for a method of operating a vehicle driveline, comprising: adjusting operation of one or more components of the vehicle driveline via a controller responsive to a disconnect clutch with a fluid pressure having an average pressure that deviates from a commanded pressure by more than the threshold amount when air is drawn into a pump. The method includes where adjusting one or more components of the hybrid vehicle driveline includes decreasing an amount of engine torque. The method includes where adjusting one or more components of the hybrid vehicle driveline includes commanding an increase of a torque capacity of the disconnect clutch via a valve. The method further comprises sampling a pressure sensor via the controller to determine the air being drawn into the pump. The method includes where air being drawn into the pump is determined via the average pressure deviating from the commanded pressure by more than the threshold amount. The method further comprises providing an indication of hydraulic system degradation in response to the fluid pressure having the average pressure that deviates from the commanded pressure by more than the threshold amount. The method includes operating the disconnect clutch with the fluid pressure having the average pressure that deviates from the commanded pressure by more than the threshold amount during a condition when air is drawn into the pump. The method further comprises adjusting operation of the one or more components responsive to the average pressure being within a threshold amount of the commanded pressure.

The method of FIG. 4 also provides for a method of operating a vehicle driveline, comprising: operating an engine supplying torque to the driveline while a disconnect clutch of the driveline is closed; operating a disconnect clutch with a fluid pressure having an amplitude that increases by more than a first threshold amount and that decreases by more than a second threshold amount in a predetermined amount of time; and adjusting operation of one or more components of the hybrid vehicle driveline via a controller responsive to the amplitude increasing by more than the first threshold amount and decreasing by more than the second threshold amount in the predetermined amount of time. The method includes where adjusting one or more components of the hybrid vehicle driveline includes decreasing an amount of engine torque. The method includes where adjusting one or more components of the hybrid vehicle driveline includes commanding an increase of a torque capacity of the disconnect clutch via a valve. The method further comprises assessing a presence of a transient vehicle condition that disturbs a state of a level of a fluid at a pickup tube of a pump. The method further comprises adjusting operation of the one or more components in response to the presence of the transient vehicle condition. The method includes where the presence of the transient vehicle condition is based on a brake pedal position. The method includes where the presence of the transient vehicle condition is based on a steering angle.

As will be appreciated by one of ordinary skill in the art, methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method of operating a vehicle driveline, comprising:
adjusting operation of one or more components of the vehicle driveline via a controller responsive to a disconnect clutch with a fluid pressure that deviates from a commanded pressure by more than a threshold amount when air is drawn into a pump.

2. The method of claim 1, where adjusting one or more components of the vehicle driveline includes decreasing an amount of engine torque.

3. The method of claim 1, where adjusting one or more components of the vehicle driveline includes commanding an increase of a torque capacity of the disconnect clutch via a valve.

4. The method of claim 1, further comprising sampling a pressure sensor via the controller to determine the air being drawn into the pump.

5. The method of claim 4, where air being drawn into the pump is determined via the fluid pressure deviating from the commanded pressure by more than the threshold amount.

6. The method of claim 1, further comprising providing an indication of hydraulic system degradation in response to the fluid pressure deviating from the commanded pressure by more than the threshold amount.

7. The method of claim 1, operating the disconnect clutch with the fluid pressure that deviates from the commanded pressure by more than the threshold amount during a condition when air is drawn into the pump.

8. The method of claim 1, further comprising adjusting operation of the one or more components responsive to the fluid pressure being within a threshold amount of the commanded pressure.

9. A method of operating a vehicle driveline, comprising:
operating an engine supplying torque to the vehicle driveline while a disconnect clutch of the vehicle driveline is closed;
operating a disconnect clutch with a fluid pressure having an amplitude that increases by more than a first threshold amount and that decreases by more than a second threshold amount in a predetermined amount of time; and
adjusting operation of one or more components of the vehicle driveline via a controller responsive to the amplitude increasing by more than the first threshold amount and decreasing by more than the second threshold amount in the predetermined amount of time.

10. The method of claim 9, where adjusting one or more components of the vehicle driveline includes decreasing an amount of engine torque.

11. The method of claim 9, where adjusting one or more components of the vehicle driveline includes commanding an increase of a torque capacity of the disconnect clutch via a valve.

12. The method of claim 9, further comprising assessing a presence of a transient vehicle condition that disturbs a state of a level of a fluid at a pickup tube of a pump.

13. The method of claim 12, further comprising adjusting operation of the one or more components in response to the presence of the transient vehicle condition.

14. The method of claim 12, where the presence of the transient vehicle condition is based on a brake pedal position.

15. The method of claim 12, where the presence of the transient vehicle condition is based on a steering angle.

16. A vehicle driveline system, comprising:
a transmission including a pump with an oil pickup tube;
a driveline integrated starter/generator (DISG);
an engine;
a driveline disconnect clutch positioned in a driveline between the engine and the DISG; and
one or more controllers including executable non-transitory instructions to operate the engine during a transient vehicle maneuver, operate the driveline disconnect clutch while an atypical driveline disconnect clutch pressure is present, sense the transient vehicle maneuver, and adjust a driveline disconnect clutch command in response to the transient vehicle maneuver being sensed and the atypical driveline disconnect clutch pressure.

17. The vehicle driveline system of claim 16, where the atypical driveline disconnect clutch pressure is a fluid pressure having an amplitude that increases by more than a first threshold amount and that decreases by more than a second threshold amount in a predetermined amount of time.

18. The vehicle driveline system of claim 16, where the atypical driveline disconnect clutch pressure is a fluid pressure having a pressure value that deviates from a commanded pressure by more than a threshold amount.

19. The vehicle driveline system of claim 16, further comprising additional executable non-transitory instructions to reduce torque of the engine in response to the transient vehicle maneuver being sensed and the atypical driveline disconnect clutch pressure.

20. The vehicle driveline system of claim 19, further comprising additional executable non-transitory instructions to increase torque of the engine in response to ceasing the transient vehicle maneuver.

* * * * *